UNITED STATES PATENT OFFICE 2,555,579

P-AMINOBENZOYL-DIETHYL AMINO-ETHANOL SALTS OF STEROIDS 3-MONOSULPHATES

Sidney Alfred Vindin Deans, Rosemount, Quebec, and James A. Scarrow, Rosemere, Quebec, Canada, assignors to Ayerst, McKenna & Harrison, Limited, Ville St. Laurent, Quebec, Canada, a corporation of Canada No Drawing. Application May 24, 1950, Serial No. 164,026

10 Claims. (Cl. 260—397.4)

The present invention relates to new p-aminobenzoyl-diethylaminoethanol salts of oestrogenic steroid 3-monosulphates of the cyclopentanopolyhydrophenanthrene series and to their preparation.

The applicants have found that when naturally occurring oestrogenic steroid 3-monosulphates of the cyclopentanopolyhydrophenanthrene series are reacted with the water-soluble salts of p-aminobenzoyl-diethylaminoethanol, new compounds are obtained, the p-aminobenzoyl-diethylaminoethanol salts of the oestrogenic steroid 3-monosulphates. The new compounds have been found to be slightly soluble in water and to possess high oestrogenic activity and to combine the anaesthetic activity of the p-aminobenzoyl-diethylaminoethanol salts.

The naturally occurring oestrogenic steroid 3-monosulphates of the cyclopentanopolyhydrophenanthrene series which can be used in accordance with the present invention are, for example, oestrone 3-monosulphate, equilin 3-monosulphate, equilenin 3-monosulphate, oestradiol 3-monosulphate, water-soluble oestrogenic conjugates obtained from unhydrolyzed pregnant mares' urine in accordance with U. S. Patent 2,429,398 and mixtures thereof.

The new stable salts of the present invention can be obtained by reacting the water-soluble salts of p-aminobenzoyl-diethylaminoethanol with an aqueous solution of one or more of the water-soluble salts of oestrogenic steroid 3-monosulphates at substantially normal room temperature. The resulting stable salt is allowed to crystallize at about 40° C. The crystals are small white needle-like. The new salts can be recrystallized by pouring a methanol solution in water.

EXAMPLES

The present invention will be more fully understood by referring to the following examples which should be taken in an illustrative sense only.

Example 1

A solution of 200 mg. of p-aminobenzoyl-diethylaminoethanol hydrochloride in 4.0 ml. of water was added to a solution of 100 mg. of sodium oestrone 3-monosulphate in 1.6 cc. of water at 30° C. resulting in the formation of a white gum which adhered to the walls of the test tube. The product was allowed to crystallize at 40° C. overnight. It consisted of small, white needle-like crystals of p-aminobenzoyl-diethylaminoethanol oestrone 3-monosulphate, the yield being 92.6% based on the oestrone content.

Example 2

A solution of 200 mg. of p-aminobenzoyl-diethylaminoethanol hydrochloride in 4 ml. of water was added to a solution of 100 mg. of sodium equilin 3-monosulphate in 1.6 cc. of water at 30° C. resulting in the formation of a white gum adhered to the walls of the test tube. The product was allowed to crystallize at 40 C. overnight. It consisted of small, white needle-like crystals of p-aminobenzoyl-diethylaminoethanol equilin 3-monosulphate.

Example 3

A solution of 200 mg. of p-aminobenzoyl-diethylaminoethanol hydrochloride in 4 ml. of water was added to a solution of 100 mg. of sodium equilenin 3-monosulphate in 1.6 cc. of water at 30° C. resulting in the formation of a white gum which adhered to the walls of the test tube. The product was allowed to crystallize at 40° C. overnight. It consisted of small, white needle-like crystals of p-aminobenzoyl-diethylaminoethanol equilenin sulphate.

Example 4

A solution of 200 mg. of p-aminobenzoyl-diethylaminoethanol hydrochloride in 4 ml. of water was added to a solution of 100 mg. of sodium oestradiol 3-monosulphate in 1.6 cc. of water at 30° C. resulting in the formation of a white gum which adhered to the walls of the test tube. The product was allowed to crystallize at 40° C. overnight. It consisted of small, white needle-like crystals of p-aminobenzoyl-diethylaminoethanol oestradiol 3-monosulphate.

We claim:

1. The p - aminobenzoyl - diethylaminoethanol salts of oestrogenic steroid 3-monosulphate of the cyclopentanopolyhydrophenanthrene series.

2. The p - aminobenzoyl - diethylaminoethanol salt of oestrone 3-monosulphate.

3. The p - aminobenzoyl - diethylaminoethanol salt of equilin 3-monosulphate.

4. The p - aminobenzoyl - diethylaminoethanol salt of equilenin 3-monosulphate.

5. The p - aminobenzoyl - diethylaminoethanol salt of oestradiol 3-monosulphate.

6. A method for preparing stable salts of p-aminobenzoyl - diethylaminoethanol oestrogenic steroid 3-monosulphates, comprising, reacting in aqueous solution a water-soluble salt of the p-aminobenzoyl-diethylaminoethanol with water-soluble salts of oestrogenic steroid 3-monosulphates.

7. A method for preparing the stable salt of p-aminobenzoyl-diethylaminoethanol oestrone 3-monosulphate, comprising, reacting in aqueous solution of a water-soluble salt of p-aminobenzoyl-diethylaminoethanol with a water-soluble salt of oestrone 3-monosulphate.

8. A method for preparing the stable salt of p-aminobenzoyl-diethylaminoethanol equilin 3-monosulphate, comprising, reacting in aqueous solution of a water-soluble salt of p-aminobenzoyl-diethylaminoethanol with a water-soluble salt of an equilin 3-monosulphate.

9. A method for preparing a stable salt of p-aminobenzoyl-diethylaminoethanol equilenin 3-monosulphate, comprising, reacting in aqueous solution a water-soluble salt of p-aminobenzoyl-diethylaminoethanol with a water-soluble salt of equilenin 3-monosulphate.

10. A method for preparing a stable salt of p-aminobenzoyl-diethylaminoethanol oestradiol 3-monosulphate, comprising, reacting in aqueous solution a water-soluble salt of p-aminobenzoyl-diethylaminoethanol with a water-soluble salt of oestradiol 3-monosulphate.

SIDNEY ALFRED VINDIN DEANS.
JAMES ALEX. SCARROW.

No references cited.